United States Patent [19]
Lee

[11] Patent Number: 5,203,540
[45] Date of Patent: Apr. 20, 1993

[54] HYDRAULIC LIFTING DEVICE

[76] Inventor: Chia-Chang Lee, No. 15, Lane 42, Te-Ming Rd., Chiayi City, Taiwan

[21] Appl. No.: 882,413

[22] Filed: May 13, 1992

[51] Int. Cl.$^5$ ............................................. B60P 1/48
[52] U.S. Cl. .................................. 254/8 B; 254/124; 254/DIG. 16
[58] Field of Search ............ 254/2 B, 8 B, 9 B, 10 B, 254/124, 134, DIG. 16; 212/261, 264, 265, 267; 414/728

[56] References Cited

U.S. PATENT DOCUMENTS

| | | | |
|---|---|---|---|
| 2,814,394 | 11/1957 | Witcher | 254/8 B |
| 3,111,232 | 11/1963 | Benson | 254/124 |
| 4,796,861 | 1/1989 | Petty | 254/8 B |
| 4,899,985 | 2/1990 | Good | 254/8 B |

Primary Examiner—Robert C. Watson
Attorney, Agent, or Firm—Ladas & Parry

[57] ABSTRACT

A hydraulic lifting device is used to lift a chassis part, such as a gearbox, and includes a mobile base and an upright prop which extends upwardly from the mobile base and which has a top end that is provided with a stationary pivot seat. A connecting bar is used to support the chassis part thereon. A driving crank arm has one end which is hinged to a first hinge point on the pivot seat and the other end hinged to a first hinge point on the connecting bar. A driven crank arm has one end hinged to a second hinge point on the pivot seat and the other end hinged to a second hinge point on the connecting bar. The pivot seat, the driving crank arm, the driven crank arm and the connecting bar cooperatively form a parallel crank four-bar linkage. A hydraulic cylinder has one end pivoted to the upright prop and another end pivoted to the driving crank arm. The hydraulic cylinder is operated so as to pivot the driving crank arm toward or away from the upright prop in order to adjust the height of the connecting bar. The pivoting action of the driving crank arm causes the driven crank arm to pivot at a similar angular speed to prevent angular deviation of the connecting bar.

7 Claims, 7 Drawing Sheets

HYDRAULIC LIFTING DEVICE

BACKGROUND OF THE INVENTION

1. Field of the Invention

The invention relates to a hydraulic lifting device used in car maintenance and repair, more particularly to an improved hydraulic lifting device which can be used when removing or installing gearboxes and which can also be used to lift car engines.

2. Description of the Related Art

Presently, the removal and/or installation of a chassis part which is relatively heavy to handle, such as a gearbox, has to be undertaken when conducting car chassis maintenance and repair. In order to remove or install such parts, it is sometimes necessary to raise the car body to a level which is approximately equal to a man's height, thereby facilitating access to the car chassis.

When removing a gearbox from the car body, a special jack or hydraulic lifting device is first secured to the base of the gearbox. The gearbox is loosened from the car body, and the jack or hydraulic lifting device is then operated so as to remove the gearbox from the car body.

Figure 1:
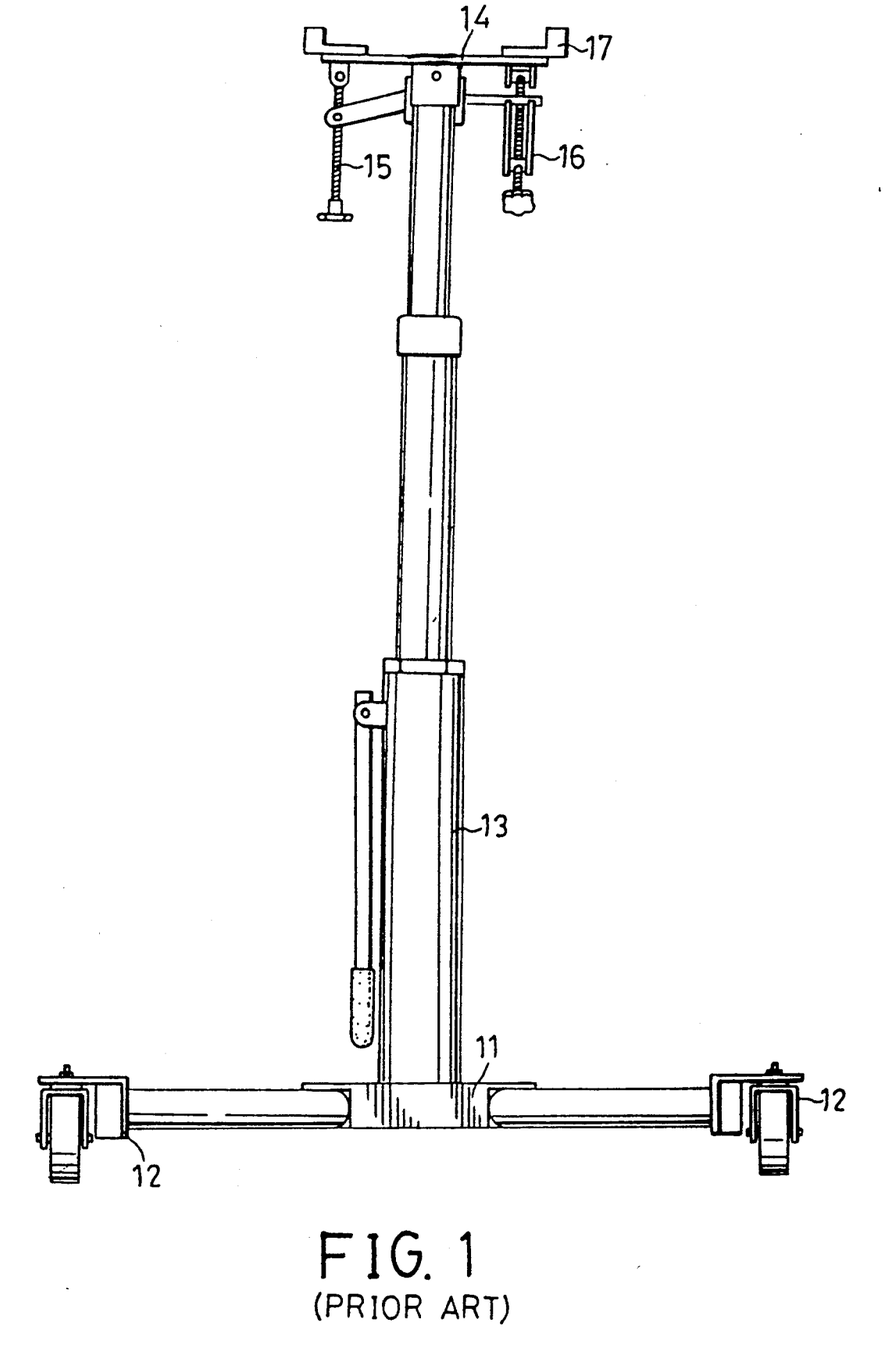
FIG. 1 is an illustration of a conventional hydraulic jack used when removing or installing gearboxes.

FIG. 1 is an illustration of a conventional hydraulic jack which is used when installing or removing a gearbox from the car body. The hydraulic jack includes a mobile base (11) which has caster units (12) provided thereon. A double acting hydraulic cylinder (13) is mounted vertically on the mobile base (11). A mounting plate (14) is provided on a top end of the hydraulic cylinder (13). Adjusting means (15, 16) are installed so as to permit adjustments in the inclination of the mounting plate (14). Finally, clamping units (17) are provided on the mounting plate (14) so as to secure the gearbox thereon.

The following are the main drawbacks of the above-described hydraulic jack:

1. Note that when the hydraulic cylinder (13) is in a fully retracted position after the gearbox has been removed from the oar body, the mounting plate (14) is disposed at a relatively high level with respect to the ground. The center of gravity due to the combined weight of the hydraulic jack and the gearbox is relatively high, thereby increasing the instability of the hydraulic jack. Movement of the hydraulic jack should therefore be conducted with utmost care in order to prevent toppling of the same.

2. Since the mounting plate (14) is disposed at a relatively high level with respect to the ground even when the hydraulic cylinder (13) is in a fully retracted position after the gearbox has been removed from the car body, another tool must be used or a relatively large force must be exerted in order to move the gearbox from the mounting plate (14) to a workbench and to move the gearbox back to the mounting plate (14) after the gearbox has been repaired. Such movements are therefore inconvenient to conduct.

3. The length of the hydraulic jack when in a fully extended position is approximately 1.9 meters. Movement of a piston of the hydraulic cylinder (13) from a fully retracted position to a fully extended position takes a relatively long time because a relatively long distance, approximately meter, is involved. Furthermore, movement of the hydraulic jack from the fully retracted position to the fully extended position is inconvenient to accomplish because a hand lever of the same should be operated about 100 times in order to achieve such a result.

4. A torque is generated whenever the center of gravity of the gearbox is not aligned with the axis of the hydraulic jack. The torque increases the instability of the hydraulic jack and produces friction between the piston and the hydraulic cylinder (13) of the hydraulic jack, thereby affecting the useful life of the same.

5. The double acting hydraulic cylinder (13) requires high precision machining and is therefore difficult and expensive to construct.

Note that it is sometimes necessary to remove a car engine from the car body when conducting engine maintenance and repair. The above-described hydraulic jack cannot be used to lift car engines. Instead, a specially designed engine hoisting device is used for this purpose.

Figure 2:
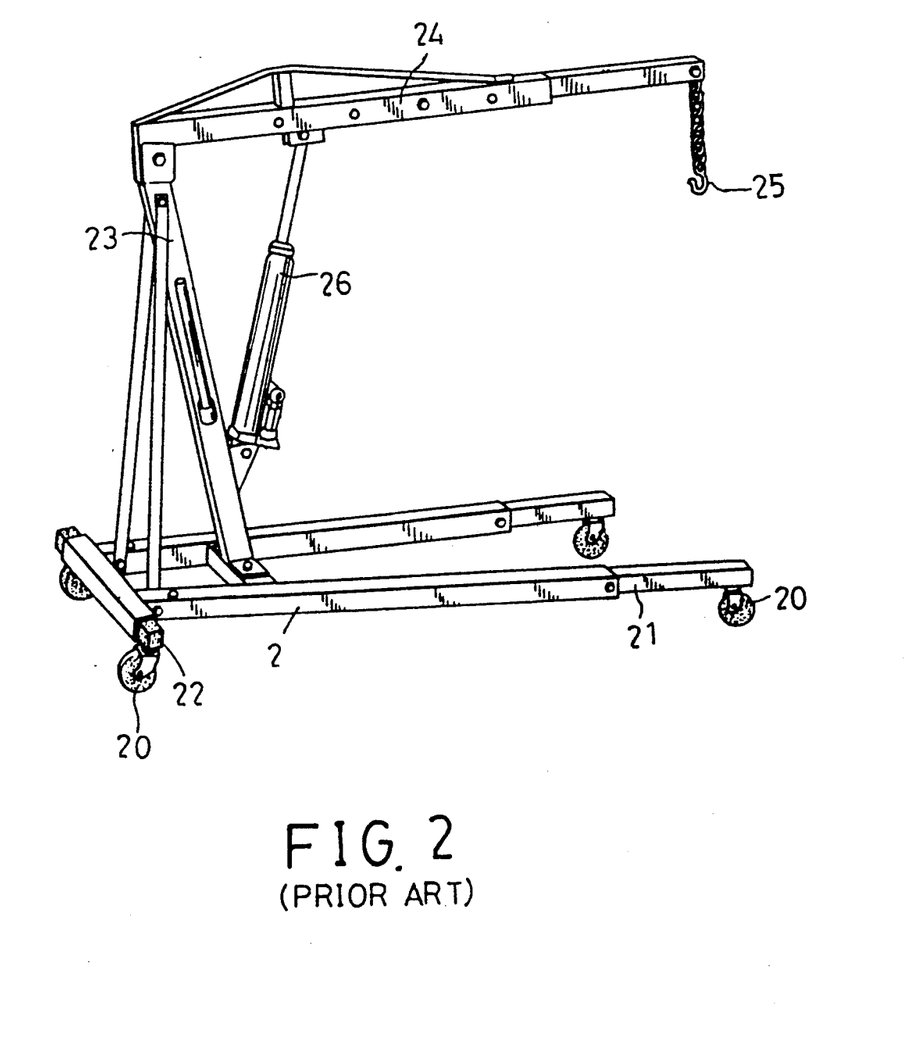
FIG. 2 is an illustration of a conventional engine hoisting device used to lift car engines.

Referring to FIG. 2, a conventional engine hoisting device is shown to comprise a mobile base (2) which has caster units provided thereon. The front end (21) of the mobile base (2) is extendible. The width of the rear end (22) of the mobile base (2) can be adjusted. An upright prop (23) is secured on the mobile base (2). A support arm (24) has one end hinged to the top of the upright prop (23). A chain hook (25) is provided on the other end of the support arm (24) and is used for hanging a car engine thereon. A hand-operated hydraulic cylinder (26) is provided between the upright prop (23) and the support arm (24). The hydraulic cylinder (26) is operated so as to raise or lower the chain hook (25) relative to the mobile base (2).

Note that the above-disclosed engine hoisting device is only used for lifting car engines and cannot be used when installing or removing a gearbox from the car body.

SUMMARY OF THE INVENTION

Therefore, the main objective of the present invention is to provide an improved hydraulic lifting device which can be used when removing or installing gearboxes and which can also be used to lift car engines.

Accordingly, the preferred embodiment of a hydraulic lifting device of the present invention can be used when installing or removing a relatively heavy chassis part, such as a gearbox, and can also be used to lift a car engine. The hydraulic lifting device comprises:

a mobile base;

an upright prop extending upwardly from the mobile base and having a top end provided with a stationary pivot seat;

a connecting bar for supporting the chassis part thereon;

a driving crank arm having one end hinged to a first hinge point on the pivot seat and the other end hinged to a first hinge point on the connecting bar;

a driven crank arm having one end hinged to a second hinge point on the pivot seat and the other end hinged to a second hinge point on the connecting bar, the distance between the first and second hinge points on the pivot seat being equal to that between the first and second hinge points on the connecting bar, the distance between the first hinge points being equal to that between the second hinge points; the pivot seat, the driving crank arm, the driven crank arm and the connecting bar cooperatively forming a parallel crank four bar linkage;

a hydraulic cylinder means having one end pivoted to the upright prop and another end pivoted to the driving crank arm, said hydraulic cylinder means being operated so as to pivot the driving crank arm toward or away from the upright prop in order to adjust the height of the connecting bar, pivoting action of the driving crank arm causing the driven crank arm to pivot at a similar angular speed to prevent angular deviation of the connecting bar;

said driving crank arm being a tubular member and including a first part which has a distal end hinged to the first hinge point on the connecting bar and a second part which extends from one end of the first part and which cooperates with the first part so as to define a substantially L-shaped bent portion, said first part extending upwardly when the driving crank arm is in an unfolded position, said first bent portion of the driving crank arm being formed with an opening to access the second part;

a support rod telescopically extending into the second part; and a chain hook provided on a distal end of the support rod for hanging the car engine thereon.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 3:
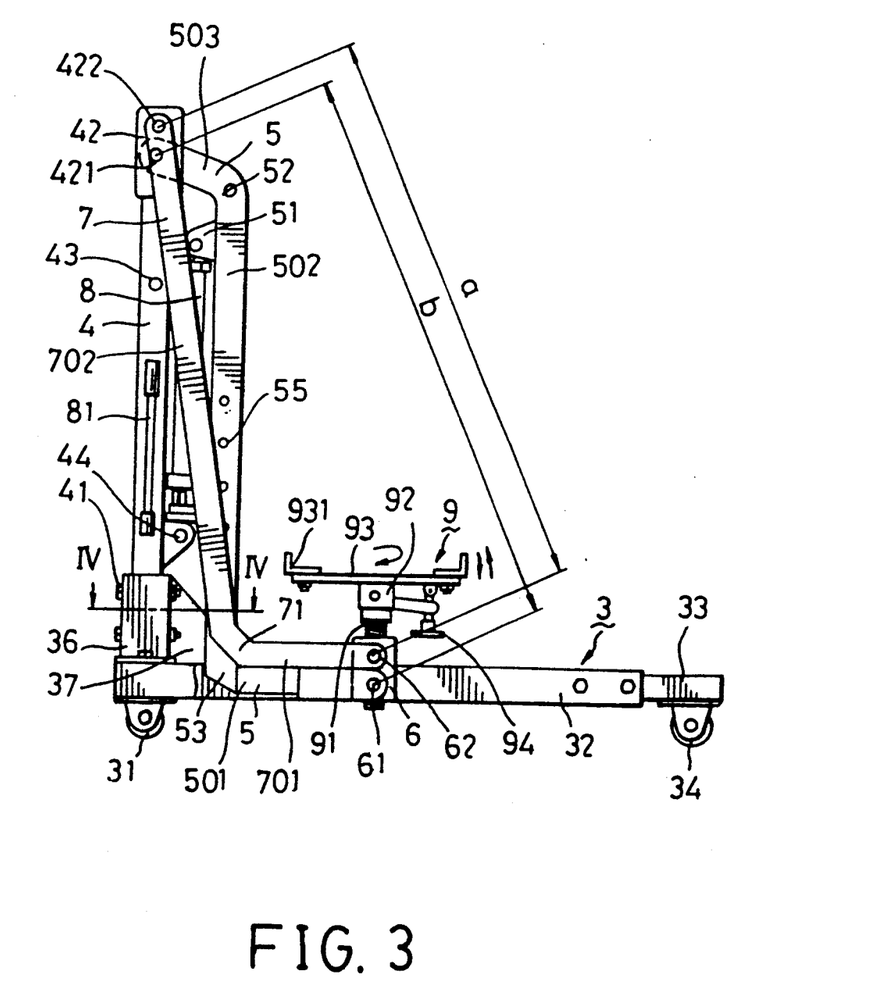
FIG. 3 is a side view of the first preferred embodiment of a hydraulic lifting device according to the present invention.
Figure 4:
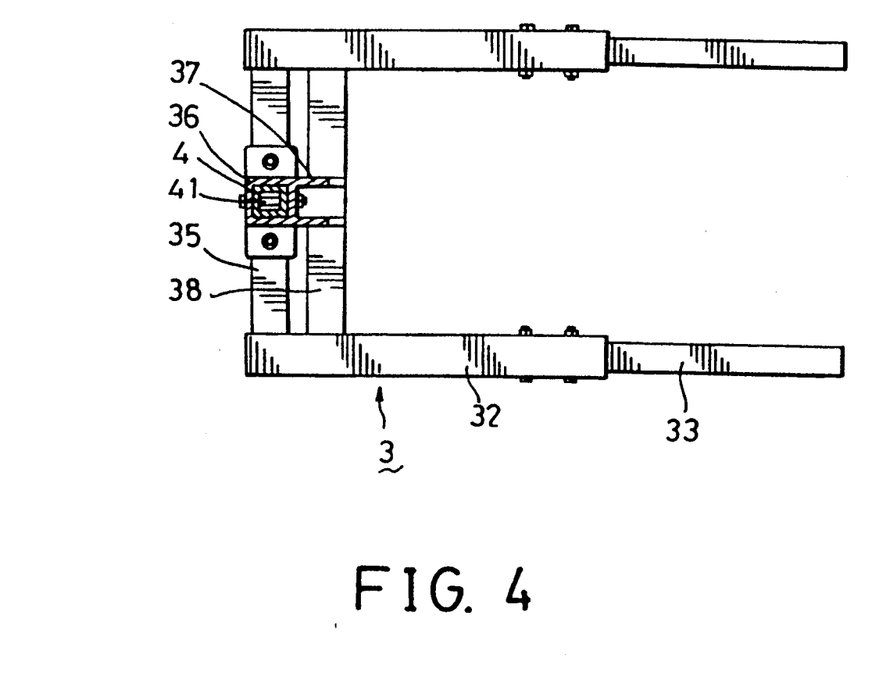
FIG. 4 is a sectional view of FIG. 3 taken substantially along line IV—IV.
Figure 5:
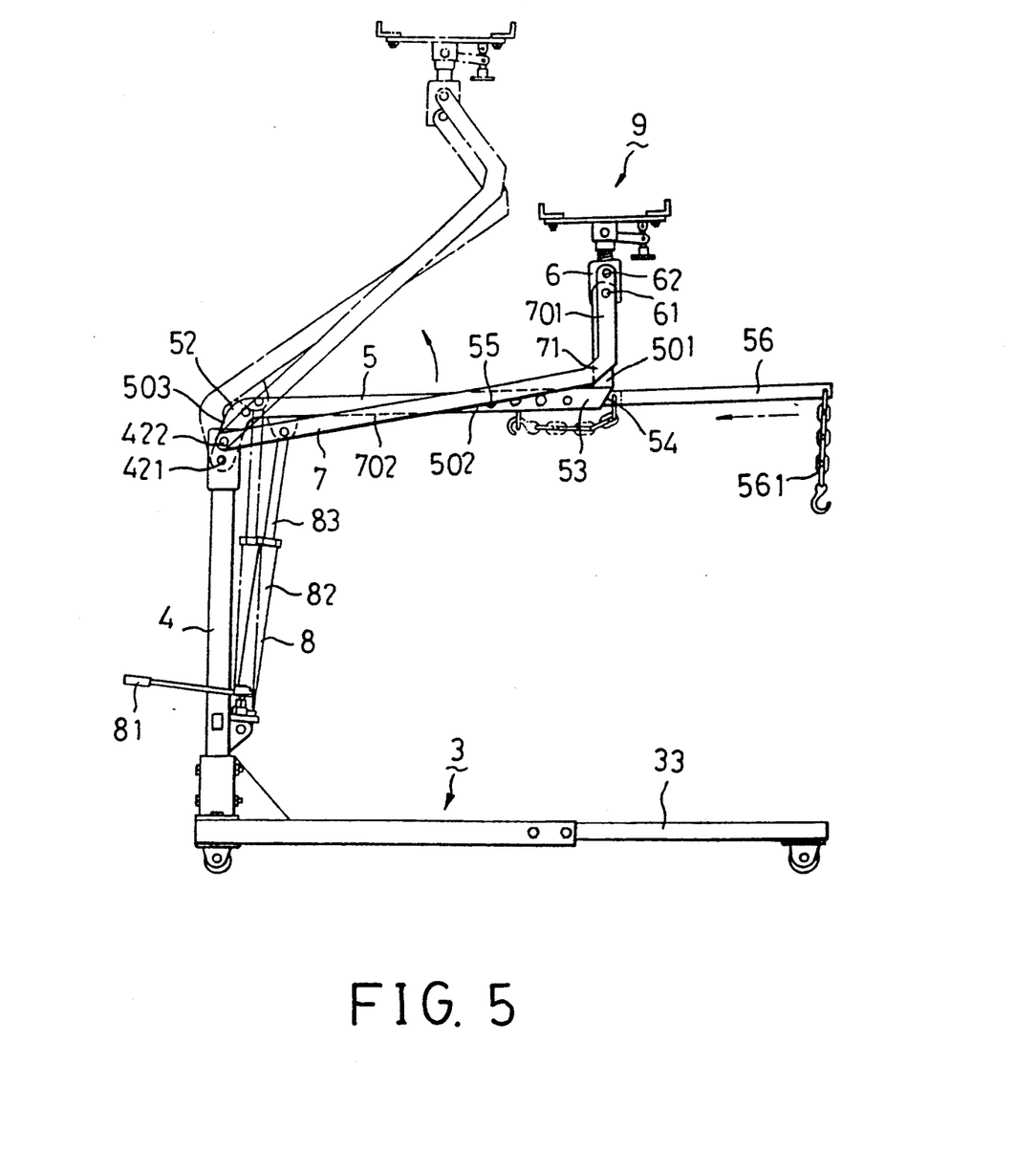
FIG. 5 is an illustration of the first preferred embodiment when in use.

Referring to FIGS. 3, 4 and 5, the first preferred embodiment of a hydraulic lifting device according to the present invention is shown to comprise a mobile base (3), an upright prop (4), a driving crank arm (5), a connecting bar (6), a driven crank arm (7), a hydraulic cylinder (8) and a mounting means (9).

The mobile base (3) includes a rear shaft (35) and a pair of tubular members (32) secured on two ends of the rear shaft (35). A rear caster unit (31) is provided near each end of the rear shaft (35). A leg member (33) is telescopically received in each of the tubular members (32). A front caster unit (34) is provided on the distal end of each leg member (33). An upright tubular sleeve (36) is secured on an intermediate portion of the rear shaft (35). A reinforcing rod (38) extends between the tubular members (32). Finally, a pair of reinforcing ribs (37) connect the tubular sleeve (36) and the reinforcing rods (38).

The upright prop (4) has a lower end which extends into the tubular sleeve (36). A threaded locking unit (41) is used to secure the upright prop (4) to the tubular sleeve (36). The top end of the upright prop (4) is provided with a stationary pivot seat (42). The upright prop (4) further has a transversely extending handle (43) provided thereon. A hinge ear (44) is formed on the upright prop (4) adjacent to the lower end of the same. The upright prop (4) is separable from the mobile base (3) to facilitate the packaging and transport of the hydraulic lifting device of the present invention.

The driving crank arm (5) is a tubular member which has a first part (501), a second part (502) extending from one end of the first part (501) and cooperating with the same so as to define a substantially L-shaped first bent portion (53) and a third part (503) extending from one end of the second part (502) and cooperating with the same so as to define a second bent portion (52) The third part (503) has one end which is hinged to a point (421) on the pivot seat (42). The second part (502) is provided with a hinge ear (51) adjacent to the second bent portion (52). When the driving crank arm (5) is in a folded position, the second part (502) is adjacent to and is substantially parallel to the upright prop (4), thereby reducing the required packaging volume of the hydraulic lifting device of the present invention. The first part (501) extends away from the upright prop (4) when the driving crank arm (5) is in the folded position. The distal end of the first part (501) is hinged to a point (61) on the connecting bar (6).

The driven crank arm (7) [one or two driven crank arms (7) may be installed] has a first part (701) and a second part (702) which extends from one end of the first part (701) and which cooperates with the same so as to define a bent portion (71). The second part (702) has one end which is hinged to a point (422) on the pivot seat (42). The point (422) is disposed above and is vertically aligned with the point (421). The other end of the first part (701) is hinged to a point (62) on the connecting bar (6). The point (62) is disposed above and is similarly in vertical alignment with the point (61). The distance between the points (421, 422) on the pivot seat (42) should be equal to the distance between the points (61, 62) on the connecting bar (6). The distance (a) between the points (422, 62) should be equal to the distance (b) between the points (421, 61). This permits the pivot seat (42), the driving crank arm (5), the driven crank arm (7) and the connecting bar (6) to form cooperatively a parallel crank four-bar linkage. A first line, which is formed by connecting the points (61, 62) on the connecting bar (6), is therefore maintained parallel to a second line, which is formed by connecting the points (421, 422) on the pivot seat (42), as the crank arms (5, 7) are moved from the folded position to the unfolded position, as shown in FIG. 5.

The hydraulic cylinder (8) is a hand-operated hydraulic cylinder and has a cylinder end which is pivoted to the hinge ear (44) on the upright prop (4) and a shaft end which is pivoted to the hinge ear (51) on the driving crank arm (5). Referring to FIG. 5, a lever (81) is operated so as to actuate the hydraulic cylinder (8), thereby causing a shaft (83) of the hydraulic cylinder (8) to extend out of a cylinder (82) of the same. Extension of the shaft (83) out of the cylinder (82) urges the crank arm (5) upward and causes corresponding upward movement of the crank arm (7) and the connecting bar (6). The crank arms (5, 7) turn at the same angular speed, thereby preventing any angular deviation of the connecting bar (6). A fluid valve (not shown) is operated so as to retract the shaft (83) into the cylinder (82) and move the crank arms (5, 7) from the unfolded position back to the folded position. Note that other types of hydraulic cylinders, such as foot-operated hydraulic cylinders and electrically-operated hydraulic cylinders, may be used instead of the hand-operated hydraulic cylinder (8) installed in the first preferred embodiment.

An upright bolt (91) secures the mounting means (9) onto the connecting bar (6). A U-shaped seat (92) pivotably connects a mounting plate (93) to the head (not shown) of the bolt (91). An adjusting means (94) is provided so as to adjust the inclination of the mounting plate (93) relative to the axis of the bolt (91). The construction and operation of the adjusting means (94) is known in the art and will not be detailed further. Clamping units (931) are provided on the mounting plate (93) so as to secure a chassis part, such as a gearbox, thereon. The bolt (91) may be operated so as to raise or lower the mounting plate (93) relative to the connecting bar (6).

The advantages of the first preferred embodiment over the conventional hydraulic jack shown in FIG. 1 are as follows:

1. Note that when the hydraulic cylinder (8) is in a fully retracted position after a chassis part, such as a gearbox, has been removed from the car body, the mounting plate (93) is disposed at a relatively low level with respect to the ground. The center of gravity due to the combined weight of the first preferred embodiment and the gearbox is relatively low, thereby enhancing the stability of the hydraulic lifting device of the present invention.

2. Since the mounting plate (93) is disposed at a relatively low level with respect to the ground when the hydraulic cylinder (8) is in a fully retracted position after the gearbox has been removed from the car body, movement of the gearbox from the mounting plate (93) to a workbench and movement of the gearbox back to the mounting plate (93) after the gearbox has been repaired can be conveniently conducted.

3. Note that because the hydraulic cylinder (8) is used to drive a linkage, a slight movement of the shaft (83) results in a larger vertical distance traversed by the mounting plate (93). Movement of the mounting plate (93) from an initial low position to a final higher position can therefore be accomplished at a faster pace.

4. Since the hydraulic cylinder (8) is pivoted to the upright prop (4) and to the driving crank arm (5), no torque, which produces friction between the piston and the cylinder (82) of the hydraulic cylinder (8), is generated.

Referring once more to FIG. 5, the first bent portion (53) of the driving crank arm (5) is formed with an opening (54) to access the second part (502). The second part (502) has a series of positioning holes (55) which are formed along its length. A support rod (56) telescopically extends into the second part (502) via the opening (54). A peg (not shown) extends into a selected one of the positioning holes (55) to retain the support rod (56) at a desired degree of extension relative to the second part (502). The distal end of the support rod (56) is provided with a chain hook (561) and is used for hanging a car engine thereon.

The support rod (56) is extended from the second part (502) when the first preferred embodiment is used to lift a car engine. The leg members (33) are similarly extended from the tubular members (32) so as to correspond with the extended length of the support rod (56). The mounting means (9) is disposed above the support rod (56) and does not interfere with the engine lifting operation. [The mounting means (9) may be detached from the connecting bar (6) if it obstructs the engine lifting operation].

The support rod (56) is extended fully into the second part when the first preferred embodiment is used when removing or installing gearboxes, thereby preventing the support rod (56) from interfering with the gearbox removal or installation operation.

Figure 6:
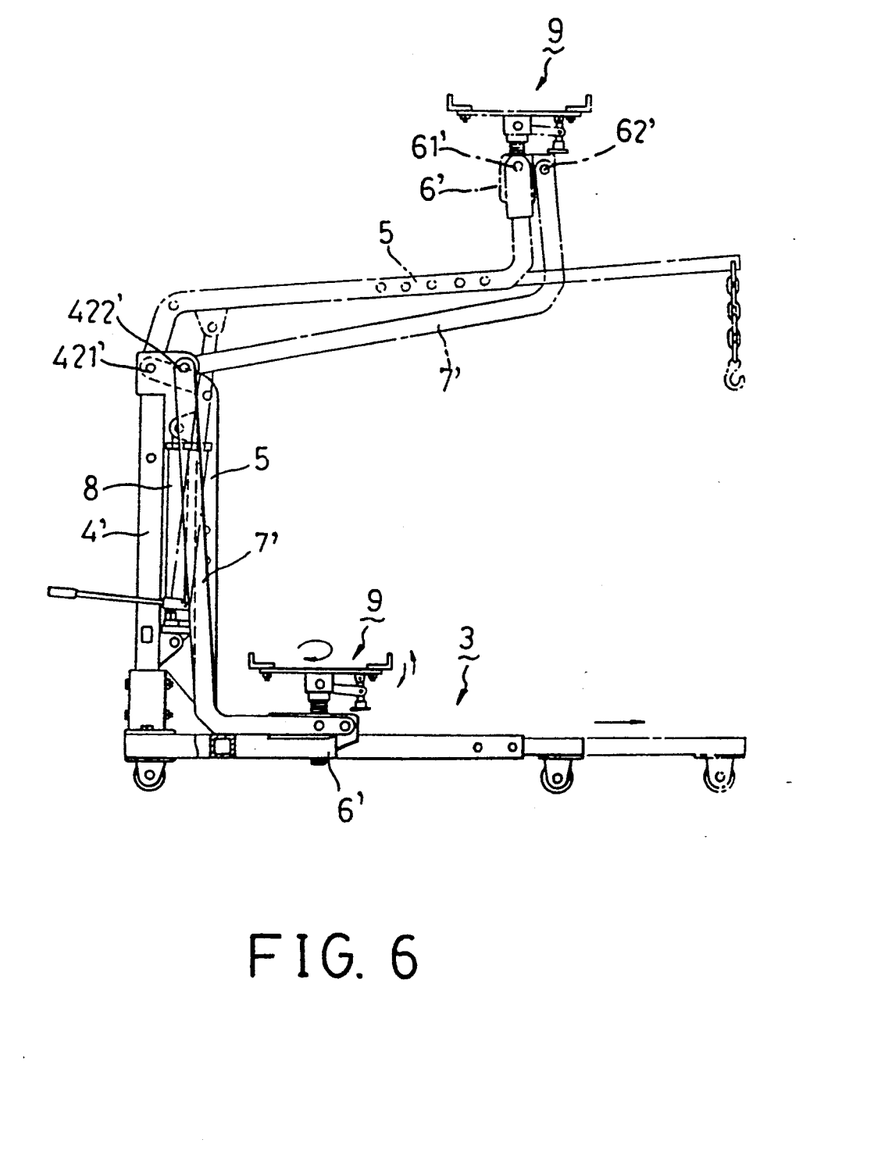
FIG. 6 is a side view of the second preferred embodiment of a hydraulic lifting device according to the present invention.

Referring to FIG. 6, the second preferred embodiment of a hydraulic lifting device according to the present invention is shown to comprise a mobile base (3), an upright prop (4'), a driving crank arm (5), a connecting bar (6'), a pair of driven crank arms (7') a hydraulic cylinder, (8) and a mounting means (9). The second preferred embodiment is substantially similar in construction to the first preferred embodiment. The driven crank arms (7') are disposed on opposite sides of the driving crank arm (5) and the connecting bar (6'). The driving crank arm (5) is hinged to a point (421') on the pivot seat (42') and to a point (61') on a center line of the connecting bar (6'). Each of the driven crank arms (7') are hinged to a point (422') on the pivot seat (42') and to a point (62') on the connecting bar (6'). The point (422') is horizontally aligned with the point (421'), while the point (62') is horizontally aligned with the point (61'). As with the first preferred embodiment, the pivot seat (42'), the driving crank arm (5), the driven crank arms (7') and the connecting bar (6') similarly cooperate to form a parallel crank four-bar linkage. This prevents any angular deviation of the connecting bar (6') when the crank arms (5, 7') are turned.

Figure 7:
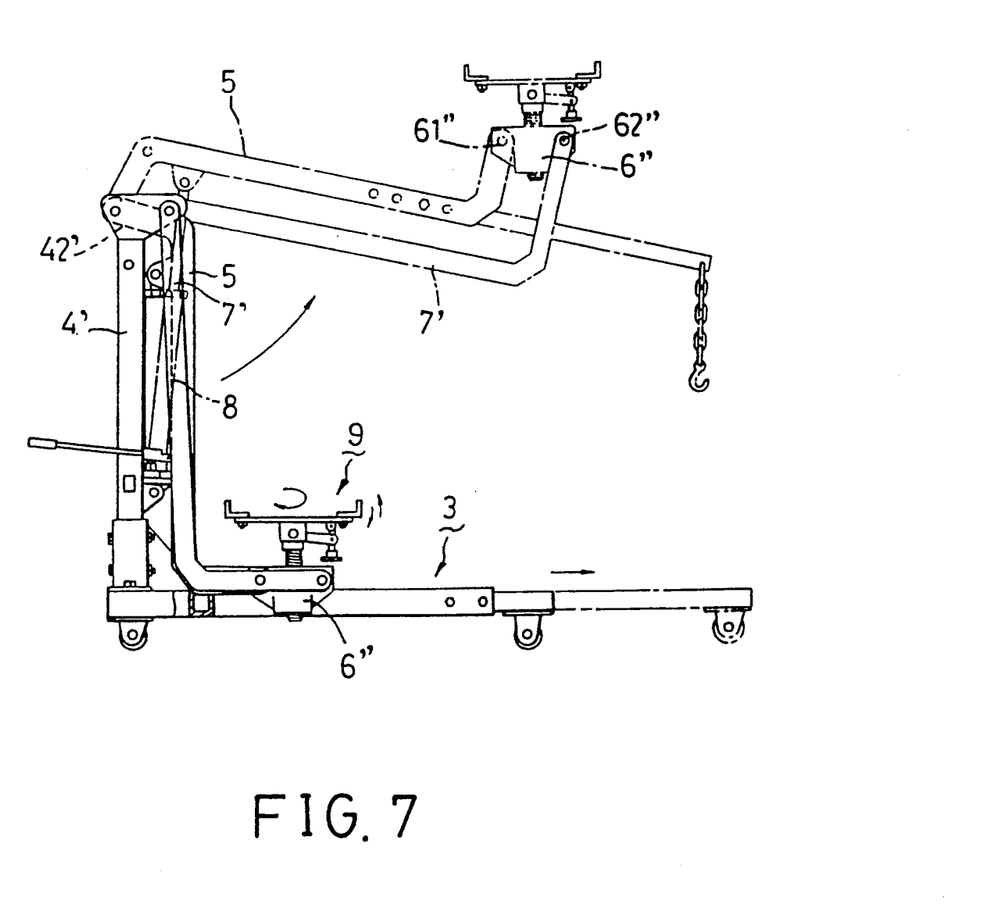
FIG. 7 is a side view of the third preferred embodiment of a hydraulic lifting device according to the present invention.

Referring to FIG. 7, the third preferred embodiment of a hydraulic lifting device according to the present invention is shown to comprise a mobile base (3), an upright prop (4'), a driving crank arm (5), a connecting bar (6"), a pair of driven crank arms (7'), a hydraulic cylinder (8) and a mounting means (9). The third preferred embodiment is substantially similar in construction to the second preferred embodiment. The driving crank arm (5) is hinged to a point (61") on one end of the connecting bar (6"). The driven crank arms (7') are disposed on opposite sides of the driving crank arm (5) and the connecting bar (6"). Each of the driven crank arms (7') are hinged to a point (62") on the other end of the connecting bar (6").

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An hydraulic lifting for lifting an object, comprising:
 a mobile base;
 an upright prop extending upwardly from said mobile base and having a top end provided with a stationary pivot seat;
 a connecting bar for supporting the object thereon;
 a driving crank arm having one end hinged to a first hinge point on said pivot seat and the other end hinged to a first hinge point on said connecting bar, said driving crank being a tubular member and having a first part which has a distal end hinged to said first hinge point and a second part extending from one end of said first part and cooperating with said first part so as to define a substantially L-shaped first bent portion, wherein said first part extends upwardly when said driving crank arm is in an unfolded position, said first bent portion of said driving crank arm being formed with an opening to access said second part;

a support rod telescopically extending into said second part;

a chained hook provided on a distal end of said support rod for hanging an object thereon;

a driven crank arm having one end hinged to a second hinge point on said pivot seat and the other end hinged to a second hinge point on said connecting bar, the distance between said first and second hinge points on said pivot seat being equal to that between said first and second hinge points on said connecting bar, the distance between said first hinge points being equal to that between said second hinge points; said pivot seat, said driving crank arm, said driven crank arm and said connecting bar cooperatively forming a parallel crank four-bar linkage; and an hydraulic cylinder means having one end pivoted to said upright prop and another end pivoted to said driving crank arm, said hydraulic cylinder means being operated so as to pivot said driving crank arm toward or away from said upright prop in order to adjust the height of said connecting bar, pivoting action of said driving crank arm causing said driven crank arm to pivot at a similar angular speed to prevent angular deviation of said connecting bar.

2. The hydraulic lifting device as claimed in claim 1, further comprising a mounting means secured to said connecting bar, said mounting means including:

an upright bolt threadedly extending into said connecting bar;

a mounting plate pivotably connected to one end of said bolt;

means for adjusting the inclination of said mounting plate relative to said bolt; and a clamping means provided on said mounting plate so as to secure the object on said mounting plate.

3. The hydraulic lifting device as claimed in claim 1, wherein said driving crank arm further includes a third part which extends from one end of said second part and which cooperates with said second part so as to define a second bent portion, said third part having one end which is hinged to said first hinge point on said pivot seat, said second part being disposed adjacent to and being substantially parallel to said upright prop when said driving crank arm is in a folded position.

4. The hydraulic lifting device as claimed in claim 1, wherein said first and second hinge points on said pivot seat are vertically aligned, said first and second hinge points on said connecting bar are similarly vertically aligned.

5. The hydraulic lifting device as claimed in claim 1, wherein said first and second hinge points on said pivot seat are horizontally aligned, said first and second hinge points on said connecting bar are similarly horizontally aligned.

6. The hydraulic lifting device as claimed in claim 5, wherein said first hinge point on said connecting bar is on a center line of said connecting bar.

7. The hydraulic lifting device as claimed in claim 5, wherein said first and second hinge points on said connecting bar are disposed on two ends of said connecting bar.

* * * * *